(12) United States Patent
Tillman

(10) Patent No.: US 7,958,008 B1
(45) Date of Patent: Jun. 7, 2011

(54) PROVIDING CUSTOMIZED MEDIA AT PHYSICAL POINT OF SALE

(75) Inventor: Chad D. Tillman, Charlotte, NC (US)

(73) Assignee: Inmar, Inc., Winston-Salem, NC (US)

( * ) Notice: Subject to any disclaimer, the term of this patent is extended or adjusted under 35 U.S.C. 154(b) by 1481 days.

(21) Appl. No.: 10/816,547

(22) Filed: Apr. 1, 2004

Related U.S. Application Data

(60) Provisional application No. 60/320,080, filed on Apr. 1, 2003.

(51) Int. Cl.
*G06Q 20/00* (2006.01)

(52) U.S. Cl. .......................................................... 705/16

(58) Field of Classification Search .................... 705/16, 705/14; 704/16
See application file for complete search history.

(56) References Cited

U.S. PATENT DOCUMENTS

| | | | |
|---|---|---|---|
| 5,205,473 A | 4/1993 | Coffin, Sr. | |
| 6,049,777 A * | 4/2000 | Sheena et al. | 705/10 |
| 6,129,274 A * | 10/2000 | Suzuki | 235/381 |
| 6,154,733 A * | 11/2000 | Pierce et al. | 705/408 |
| 6,456,981 B1 * | 9/2002 | Dejaeger et al. | 705/14 |
| 6,854,656 B2 * | 2/2005 | Matsumori | 235/472.01 |
| 6,901,378 B1 * | 5/2005 | Linker et al. | 705/27 |
| 6,991,066 B2 * | 1/2006 | Persky | 186/59 |
| 7,039,683 B1 * | 5/2006 | Tran et al. | 709/213 |
| 7,050,989 B1 * | 5/2006 | Hurt et al. | 705/14 |
| 7,103,906 B1 * | 9/2006 | Katz et al. | 725/87 |
| 7,114,170 B2 * | 9/2006 | Harris et al. | 725/34 |
| 7,330,828 B2 | 2/2008 | Schoder et al. | |
| 7,346,549 B2 * | 3/2008 | Deas et al. | 705/26 |
| 7,433,836 B1 * | 10/2008 | August et al. | 705/34 |
| 2002/0082925 A1 | 6/2002 | Herwig | |
| 2005/0004837 A1 * | 1/2005 | Sweeney et al. | 705/14 |

OTHER PUBLICATIONS

Business Wire. "Metro Group Uses Philips' RFID Technology to Shape the Future of Retail" Apr. 29, 2003.*

* cited by examiner

*Primary Examiner* — Matthew S Gart
*Assistant Examiner* — Oluseye Iwarere
(74) *Attorney, Agent, or Firm* — Womble Carlyle Sandridge & Rice PLLC

(57) ABSTRACT

A method of providing to a customer customized media at a physical point of sale (PPOS) of a good/service includes the steps of (a) receiving an identifier from the customer at the PPOS, (b) retrieving a media profile that is maintained in a database in association with the identifier, the media profile identifying at least one media content type, (c) generating a deliverable in accordance with the retrieved media profile by obtaining an item of the media content type identified in the retrieved media profile, and (d) communicating the generated deliverable to the customer at the PPOS.

42 Claims, 12 Drawing Sheets

PROVIDING CUSTOMIZED MEDIA AT PHYSICAL POINT OF SALE

CROSS REFERENCE TO RELATED APPLICATIONS

This Application claims priority benefit under 35 U.S.C. 119(e) to U.S. Provisional Application Ser. No. 60/320,080 filed on Apr. 1, 2003, for "Providing Customized Media at the Physical Point of Sale (PPOS)", which is hereby incorporated by reference in the entirety and made part hereof.

BACKGROUND OF THE INVENTION

The present invention generally relates to media distribution and, more particularly, to systems and methods of providing customized media at a physical point of sale (PPOS) to a customer of a good or service.

Currently, if alone, a customer at a fast-food restaurant who has stopped for a quick meal will pass the time during the meal by people watching or reading whatever might be available at hand. Thus, for instance, a customer might read a newspaper that is provided by the restaurant as a courtesy for the customer's enjoyment or that was left behind by a previous customer. The customer also might find himself spending his time reading media preprinted on a bag, cup, or tray mat simply to pass the time. Alternatively, the customer might read preprinted nutritional information and the like made available by the restaurant. Had the customer planned ahead, he might have brought along with him something to read. This often is not the case, however, especially where the decision to stop at the fast-food restaurant was spontaneous. Furthermore, any information that might be read usually is not current to the minute, or even to the hour. Even newspapers are only as current as of the hours before their printing.

A need therefore exists for a system and method for providing media to a customer at a PPOS of a good or service at the time of the sale. A need further exists for a system and method for providing media to a customer at the PPOS at the time of the sale, wherein the media is customized for the customer, thereby insuring that the media will at least be of some interest to the customer. A yet further need exists for a system and method for providing media to a customer at the PPOS at the time of the sale, wherein the media is fairly current as of the time of the sale.

One or more of these needs are met by one or more of the systems and methods of the present invention.

SUMMARY OF THE INVENTION

The present invention is generally directed to a method of providing to a customer customized media at a physical point of sale (PPOS) of a good or service.

According to a first aspect of the present invention, the method includes receiving an identifier from the customer at the PPOS, retrieving a media profile that is maintained in a database in association with the identifier, the media profile identifying at least one media content type, generating a deliverable in accordance with the retrieved media profile by obtaining an item of the media content type identified in the retrieved media profile, and communicating the generated deliverable to the customer at the PPOS.

In some instances, the PPOS may be a restaurant, for example, a McDonald's™ restaurant or a Krispy Kreme™ restaurant. In other instances, the PPOS may be a coffee shop, such as a Starbucks™ coffee shop, a Seattle's Best™ coffee shop, or a Caribou™ coffee shop. In yet other instances, the PPOS may be an automobile service store, such as a Firestone™ automobile service store. In still other instances, the PPOS may be a video rental store, such as a Blockbuster™ video rental store.

According to one variation of the first aspect, the step of communicating the generated deliverable includes providing to the customer at the PPOS a printed publication including the identified media content. In some such instances, the step of communicating the generated deliverable may include printing the item of the identified media content type on a sleeve of a coffee cup that is provided to the customer. In other such instances, the step of communicating the generated deliverable may include printing the item of the identified media content type on a tray mat that is provided to the customer. In yet other such instances, the step of communicating the generated deliverable may include printing the item of the identified media content type on packaging of a good that is sold to the customer. In still other such instances, the step of communicating the generated deliverable may include printing the item, of the identified media content type on a bag in which a good is provided to the customer.

According to another variation of the first aspect of the present invention, the step of communicating the generated deliverable includes wirelessly transmitting at the PPOS the item of the identified media content type to the customer. In some such instances, the step of communicating the generated deliverable may include wirelessly transmitting at the PPOS the item of the identified media content type to a mobile computer device of the customer. In other such instances, the step of communicating the generated deliverable may include wirelessly transmitting at the PPOS the item of the identified media content type to a personal digital assistant of the customer. In other such instances, the step of communicating the generated deliverable may include wirelessly transmitting at the PPOS the item of the identified media content type to a personal communication device of the customer. In yet other such instances, the step of communicating the generated deliverable may include wirelessly transmitting at the PPOS the item of the identified media content type to a web-enabled telephone of the customer.

According to another variation of the first aspect, the media profile may be unique to the customer.

According to another variation of the first aspect, the media content type identified in the media profile may be selected by the customer prior to the time of sale of the good or service.

According to another variation of the first aspect, the customer may select the media content type when setting up or editing the media profile. In some such instances, the setting up or editing of the media profile by the customer may be accomplished online via the Internet.

According to another variation of the first aspect of the present invention, the item of the identified media content type may include information obtained over the Internet at the time of the sale of the good or service.

According to another variation of the first aspect of the present invention, the step of receiving an identifier at the time of the sale of the good or service may include reading the identifier from a magnetic stripe card of the customer at the PPOS.

According to a second aspect of the present invention, a method of providing customized media at a physical point of sale (PPOS) to a customer of a good or service includes receiving an identifier from the customer at the PPOS, determining a media content type that has been pre-selected by the customer, generating a deliverable by obtaining an item of the determined media content type, and communicating the generated deliverable to the customer at the PPOS.

According to one variation of the second aspect, the identifier uniquely identifies the customer.

According to another variation of the second aspect, the identifier uniquely identifies a class of customers from a plurality of classes of customers. In some such instances, the classes of customers may be mutually exclusive. In other such instances, the identifier uniquely may identify a subset of classes of customers from a set of a plurality of classes of customers.

According to a third aspect of the present invention, a method includes maintaining in a computer database a plurality of media profiles for customers, each media profile including a unique identifier for each customer, each media profile identifying types of media content previously identified by each customer, receiving a unique identifier and retrieving the media profile for the unique identifier received, obtaining media content in accordance with the media profile, and communicating the media content to the particular customer in conjunction with a purchase by the customer at a physical point of sale of the purchase.

BRIEF DESCRIPTION OF THE DRAWINGS

Further features and benefits of the present invention will be apparent from a detailed description of certain preferred embodiments thereof as shown in the drawings herein labeled FIGS. 1-12.

DETAILED DESCRIPTION OF THE INVENTION

The present invention is generally directed to a method of providing to a customer customized media at a physical point of sale (PPOS) of a good or service.

As a preliminary matter, it will readily be understood by those persons skilled in the art that the present invention is susceptible of broad utility and application in view of the following detailed description of various aspects of the present invention. Many devices, methods, embodiments, and adaptations of the present invention other than those herein described, as well as many variations, modifications, and equivalent arrangements thereof, will be apparent from or reasonably suggested by the present invention and the following detailed description thereof, without departing from the substance or scope of the present invention. Accordingly, while the present invention is described herein in detail in relation to certain aspects, it is to be understood that this disclosure is illustrative and exemplary and is made merely for purposes of providing a full and enabling disclosure of preferred embodiments of the invention. The disclosure herein is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
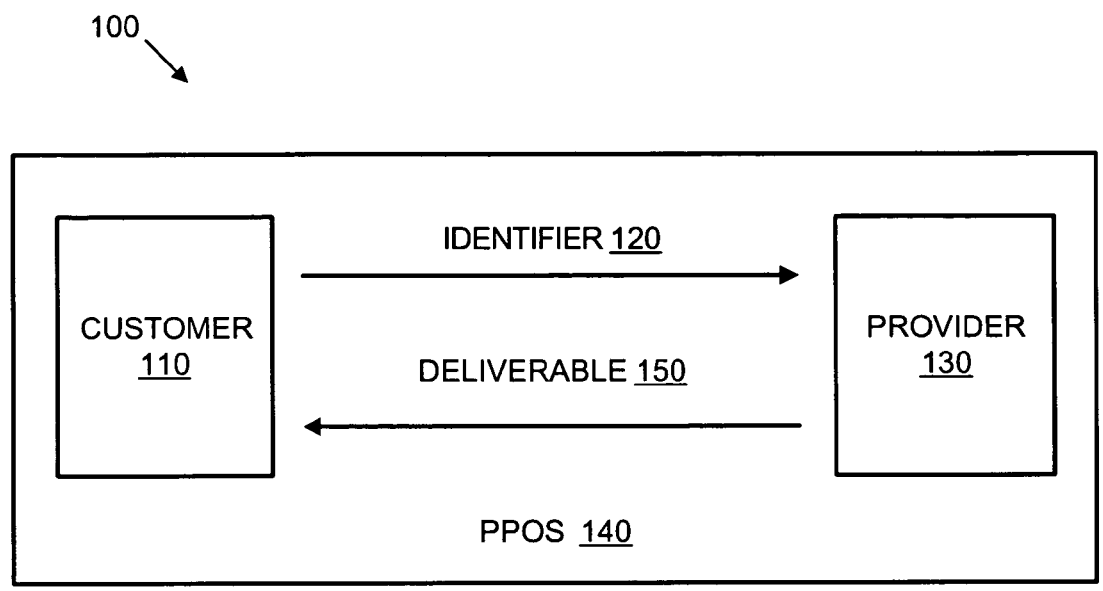
FIG. 1 illustrates the basic features of an exemplary system according to the present invention.

Turning to FIG. 1, the basic system 100 of the present invention is illustrated in which a customer 110 communicates an identifier 120 to a provider 130 of a good, service, or both (collectively identified herein as "good/service" or "good or service") at a physical point of sale (PPOS) 140 of the good/service. In accordance with the present invention, a deliverable 150 is also provided to the customer 110 by the provider 130 at the PPOS 140. In this regard, the deliverable 150 is said to be provided in conjunction with the good/service.

The present invention contemplates any suitable PPOS. In some instances, the PPOS may be a restaurant, for example, a McDonald's™ restaurant or a Krispy Kreme™ restaurant. In other instances, the PPOS may be a coffee shop, such as a Starbucks™ coffee shop, a Seattle's Best™ coffee shop, or a Caribou™ coffee shop. In yet other instances, the PPOS may be an automobile service store, such as a Firestone™ automobile service store. In still other instances, the PPOS may be a video rental store, such as a Blockbuster™ video rental store.

In the system 100, the deliverable 150 includes at least one item of a media content type. The media content type is generally selected beforehand by the customer 110, and the selected media content type is determinable at the PPOS 140 at the time of the sale of the good/service based on the identifier 120 communicated by the customer 110. The deliverable 150 provided to the customer 110 in conjunction with the good/service thus is customized with regard to the customer 110.

The media content type is generally selected by the customer prior to arriving at the PPOS to purchase a good/service. In some instances, the customer may select the media content type when setting up or editing his or her media profile. In some such instances, the customer may set up and/or edit the media profile online via the Internet.

The media content type pre-selected by the customer may include one of various types of media content. In some instances, the item of the identified media content type may include information obtained over the Internet at the time of the sale of the good or service. By way of example and not limitation, the item of the identified media content type may include an electronic coupon, a game piece of a promotion associated with the good or service sold, AvantGo™ type channel content, or a movie or video review, in particular, a movie or video review of an upcoming or currently released movie or video. In other instances, the item of the identified media content type may include an electronic publication, for example, a magazine, to which the customer subscribes. In some such instances, the subscription information of the customer may be stored in association with the unique identifier of the customer.

By way of example and not limitation, the various types of media content may include weather information, nutritional information, sports information, news, financial information, information pertaining to stocks or stock quotes, including real-time stock quotes, information pertaining to a horoscope, or traffic information, including traffic information pertaining to a route predetermined by the customer.

Various deliverables are contemplated by the presentation. By way of example and not limitation, the deliverable may include a cup sleeve having the item of the identified media content type printed thereon, a bag having the item of the identified media content type printed thereon, a collection of web clippings, or a printout of a web page. Generally, the deliverable is not merely a record of the sale or a receipt of the sale. The deliverable may include audio, audio-video, and/or images or pictures, as desired.

Various means of communicating the deliverable to the customer are contemplated by the present invention. In some instances, the step of communicating the generated deliverable may include providing to the customer at the PPOS a printed publication including the identified media content. In some such instances, the step of communicating the generated deliverable may include printing the item of the identified media content type on a sleeve of a coffee cup that is provided to the customer. In other such instances, the step of communicating the generated deliverable may include printing the item of the identified media content type on a tray mat that is provided to the customer. In yet other such instances, the step of communicating the generated deliverable may include printing the item of the identified media content type on packaging of a good that is sold to the customer. In still other such instances, the step of communicating the generated deliverable may include printing the item of the identified media content type on a bag in which a good is provided to the customer.

In other instances, the step of communicating the generated deliverable may include wirelessly transmitting at the PPOS the item of the identified media content type to the customer. In some such instances, the step of communicating the generated deliverable may include wirelessly transmitting at the PPOS the item of the identified media content type to a mobile computer device of the customer. In other such instances, the step of communicating the generated deliverable may include wirelessly transmitting at the PPOS the item of the identified media content type to a personal digital assistant of the customer. In other such instances, the step of communicating the generated deliverable may include wirelessly transmitting at the PPOS the item of the identified media content type to a personal communication device of the customer. In yet other such instances, the step of communicating the generated deliverable may include wirelessly transmitting at the PPOS the item of the identified media content type to a web-enabled telephone of the customer.

Figure 2:
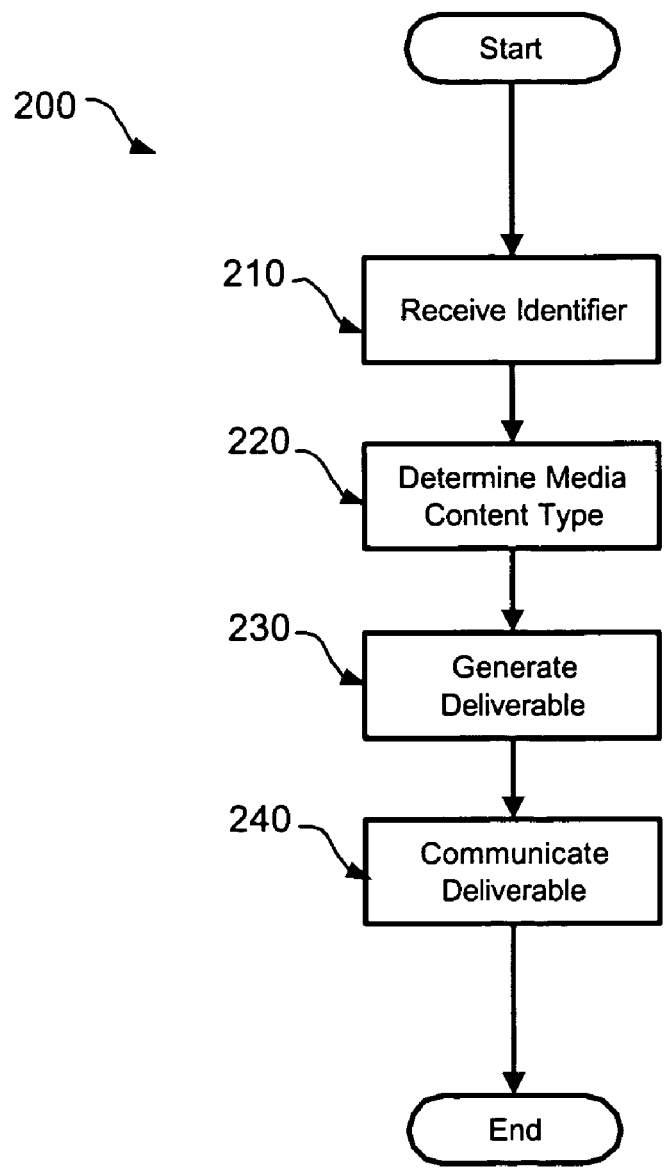
FIG. 2 illustrates the basic steps associated with the system of the present invention.

The basic steps 200 associated with the system 100 of the present invention are illustrated in FIG. 2. In this regard, the customer communicates (Step 210) the identifier to the provider at the PPOS. The provider then determines (Step 220), based on the identifier, a media content type that has been selected beforehand by the customer. The deliverable then is generated (Step 230) by obtaining an actual item of the determined media content type, and the generated deliverable then is communicated (Step 250) to the customer at the PPOS.

According to one aspect of the present invention, the media content type is pre-selected by the customer and recorded in a media profile. The media profile is associated with the identifier so that the media profile is retrievable based on the identifier. In this regard, the media profile may be stored in a computer database and indexed at least by the identifier so that the media profile is readily retrievable by searching for the identifier. Alternatively, the media content type selected by the customer may correspond to a class of identifiers. Upon selection of the particular media content type, the customer is assigned one of the identifiers of that class for use by that customer. In such instances, there may be at least two classes of identifiers with each class representing a particular type of media content.

According to another aspect of the present invention, the identifier uniquely identifies the customer whereby no two customers have the same identifier. Thus, according to this aspect, customization of the deliverable may be achieved on an individual basis so that the individual preferences of the customer may be taken into account.

According to another alternative aspect of the present invention, customers are identified as being in certain classes, where each customer in a class has an identifier that uniquely identifies the class. In such instances, customization of the deliverable is achieved to the overall preferences of the class. Moreover, the classes may or may not be mutually exclusive.

Various identifier types are contemplated by the present invention. For example, the identifier may include an account number of a loyalty program in which the customer is enrolled. Alternatively, the identifier may include a public key of a public-private key pair of the customer.

The following discussion is directed to various examples of commercial utilizations contemplated by the present invention. While certain examples are shown and described in detail herein, it should be understood that various other applications of the present invention are contemplated.

Figure 3:
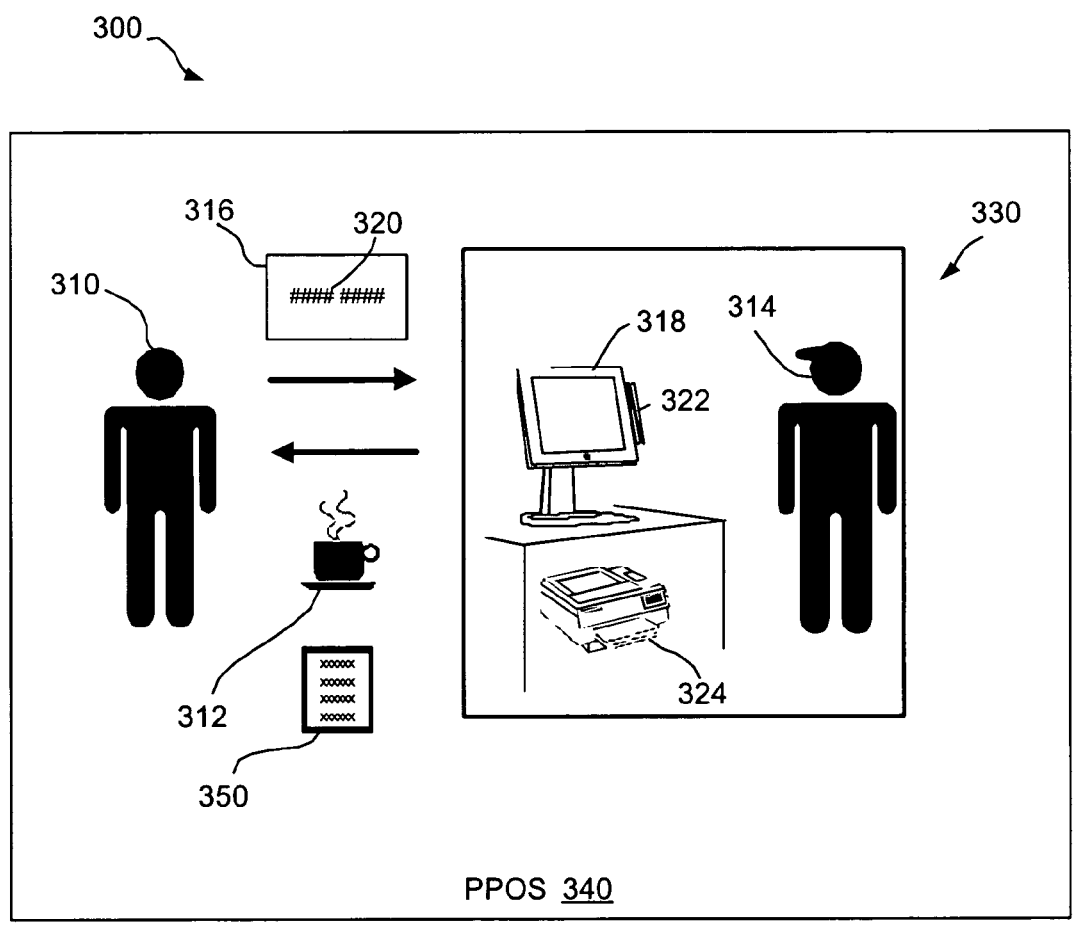
FIG. 3 illustrates a specific example of a system according to the present invention.

With reference to FIG. 3, an example of a system 300 according to the present invention is illustrated in which a customer 310 purchases a cup of coffee 312 from a sales clerk 314 of the provider (indicated generally at 330). The PPOS 340 represents a specialty coffee shop such as, for example, Starbucks™ coffee shop, Caribou™ coffee shop, or Seattle's Best™ coffee shop.

During the purchase of the cup of coffee 312, the customer 310 presents a card 316 to the sales clerk 314. The card 316 identifies the customer to the provider 330 for purposes of providing the customer customized media. The card 316 identifies the customer by including, for example, a human-readable identifier 320 printed on the card 316. The identifier 320 includes, for example, an alphanumeric number. Alternatively or in combination therewith, the card 316 may also include, for example, a machine-readable magnetic stripe or bar code having the identifier 320 encoded therein, which may be located on the back of the card 316. If the identifier 320 is printed on the card 316 for reading by the sales clerk 314, the sales clerk 314 reads the identifier 320 from the card 316 and enters the identifier 320 into the terminal 318. If the card 316 includes the machine-readable magnetic stripe or bar code, the sales clerk 314 swipes the card 316 through a reader 322, for example, of the terminal 318, for reading of the identifier 320.

The card 316 may be issued by a financial institution unrelated to the provider 330, such as a credit or debit card. In such instances, the identifier may include the name of the customer and/or part or all of the card number, or some mathematical function thereof. Alternatively, the card 316 may be issued by the provider 330, like a rewards, loyalty, or stored-value card. In these scenarios, the identifier may be determined directly by the provider 330.

Based on the identifier 320, a preference of the customer regarding a media content type that has been predetermined beforehand by the customer 310 is identified. An item of the media content type then is obtained and a deliverable in the form of a printed publication 350 including the obtained item of the media content type is generated via printer 324. The printed publication 350 then is communicated to the customer 310 via the sales clerk 314 by presenting the printed publication 350 to the customer 310 with his cup of coffee 312.

Some examples of the printed publication 350 include a tray mat, single sheet of paper, the sales receipt, or even a coffee cup insulating sleeve such as that disclosed in U.S. Pat. No. 5,205,473, incorporated herein by reference. Other examples include a bag into which the goods are placed, or other wrapper, such as a food wrapper.

According to one aspect of the present invention, the media content type includes traffic information and, specifically, real time or near real time traffic information relating to one or more specific routes that the customer 310 might be about to take to work. Thus, if the customer 310 were buying, for example, a cup of coffee on his commute to work one morning, the media content type might include traffic information specifically pertaining to the different routes that the customer could take in making the commute. In this context, the customer would identify the different routes as part of the selection of traffic information as a desired media content type. Upon receiving his coffee and printed publication 350, the customer 310 could enjoy his coffee while reading the traffic information. This enables the customer to choose the most efficient travel route to take ensuring that the stopover for coffee does not delay the customer's arrival at work.

According to another aspect of the present invention, the media content type includes financial information, for example, stock information and, specifically, real time quotes for stocks that might be of interest the customer 310 and/or stocks that the customer 310 might own. Thus, if the customer 310 were buying a cup of coffee at any particular coffee shop of the provider 330, regardless of its location, the customer 310 will be able to know the real time quotes of these stocks, even when Internet access or other means of communication is unavailable to the customer for checking these quotes.

According to one variation of these aspects of the present invention, the media content type is pre-selected by the customer and recorded in a media profile. The media profile is associated with the identifier so that the media profile is retrievable based on the identifier. In this regard, the media profile may be stored in a computer database and indexed at least by the identifier so that the media profile is readily retrievable by searching for the identifier.

Figure 4:
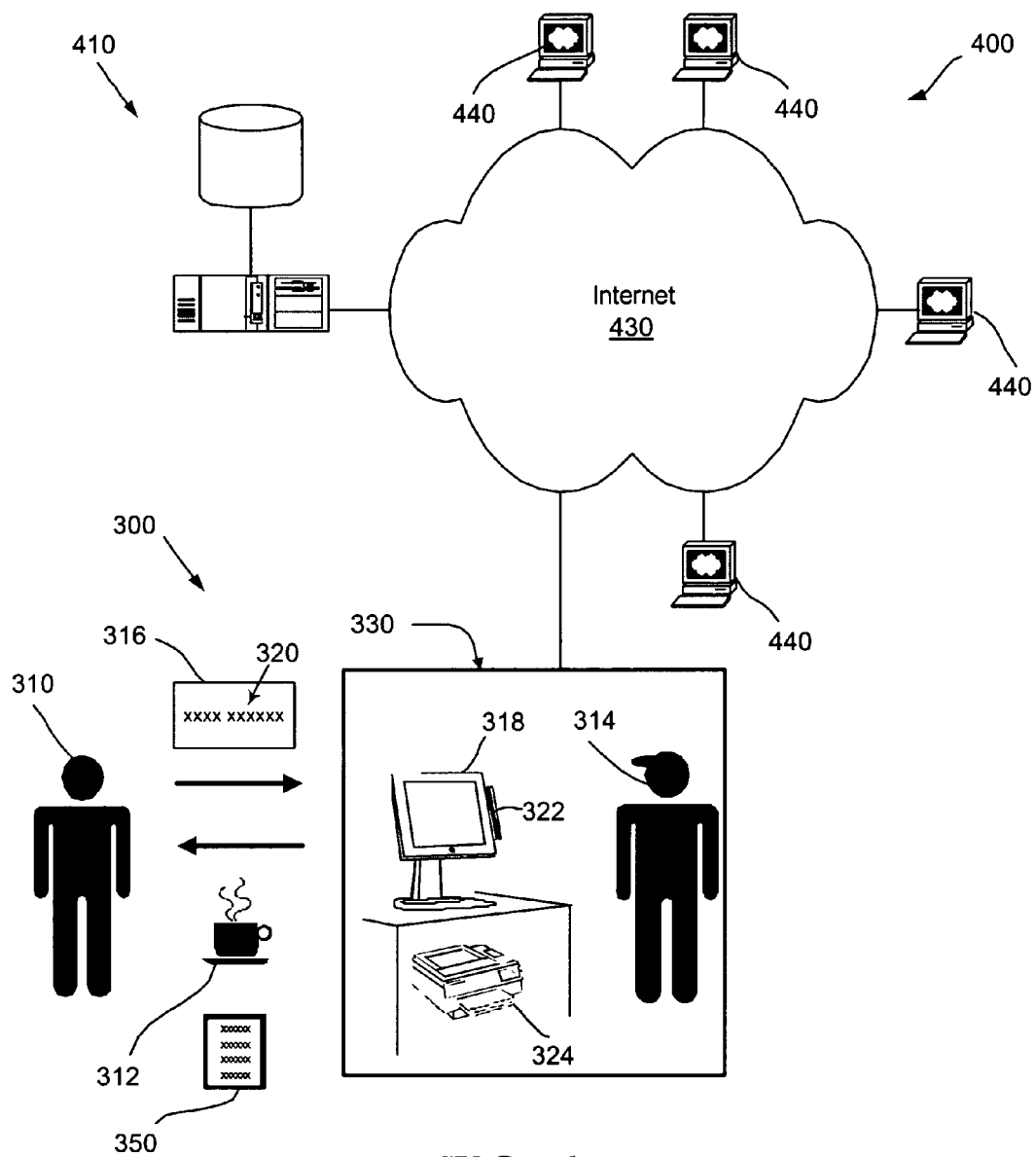
FIG. 4 illustrates an exemplary system for creating and maintaining customer profiles according to the present invention.

An example of such a system for creating and maintaining customer profiles is illustrated in FIG. 4. The system 400 includes a centralized media profile database 410 wherein the media profiles are indexed by the identifiers. The provider 330 is disposed in electronic communication with the database 410 for readily communicating the identifier 320 to the database 410. In the exemplary system 400 shown in FIG. 4, the provider 330 is disposed in communication with the database 410 via the Internet 430. Alternatively, the provider 330 may be connected directly to the database 410 via a secure communications line, such as via dial-up or via a private line (not shown).

Upon receipt of the identifier 320, the media profile of the customer 310 then is retrieved based on the identifier 320. An item of the media content type specified therein is then obtained (or items if more than one media content type is identified in the profile). The item or items then are communicated back to the provider 330 and printed via printer 324 for presentation to the customer 310 by the sales clerk 314 with the cup of coffee 312. Preferably, all of this happens within moments of the customer 310 presenting the card 316.

The database 410 may be maintained by the provider 330. In this scenario, the provider 330 may represent one of many retail outlets in a chain, and the database 410 may be maintained by the "home" or corporate office of the chain for use by each retail outlet. Alternatively, the maintenance and operation of the database 410 may be outsourced to a third party (hereinafter sometimes referred to as a "media profile manager") that is unrelated to the provider 330. In either scenario, the retrieval of the media profile, determination of the media content type, and acquisition of an item of the determined media content type is considered to be done "on the behalf of" the provider 330 for a particular transaction with the provider 330.

Like the provider 330, customers of the provider 330 (including customer 310 with whom the illustrated transaction occurs) may be able to communicate with the database 410 via personal computers 440 and update the media content type or types identified in their media profiles. Furthermore, each customer may gain access to his or her media profile using his or her identifier or some other uniquely identifying information, such as the customer's name and phone number or a password or PIN provided to the customer during registration of that customer's media profile. If both maintenance and registration are accomplished via the Internet, the card 316, if issued by or on the behalf of the provider 330, may be mailed to the customer. Alternatively, the customer may specify a store or retail outlet at which the customer will pick up the card 316. Furthermore, while registration and maintenance of a customer's profile via the Internet is described herein, it should be understood that registration and/or maintenance likewise could be accomplished at a retail outlet of the provider generally or at the physical point of sale.

Figure 5:
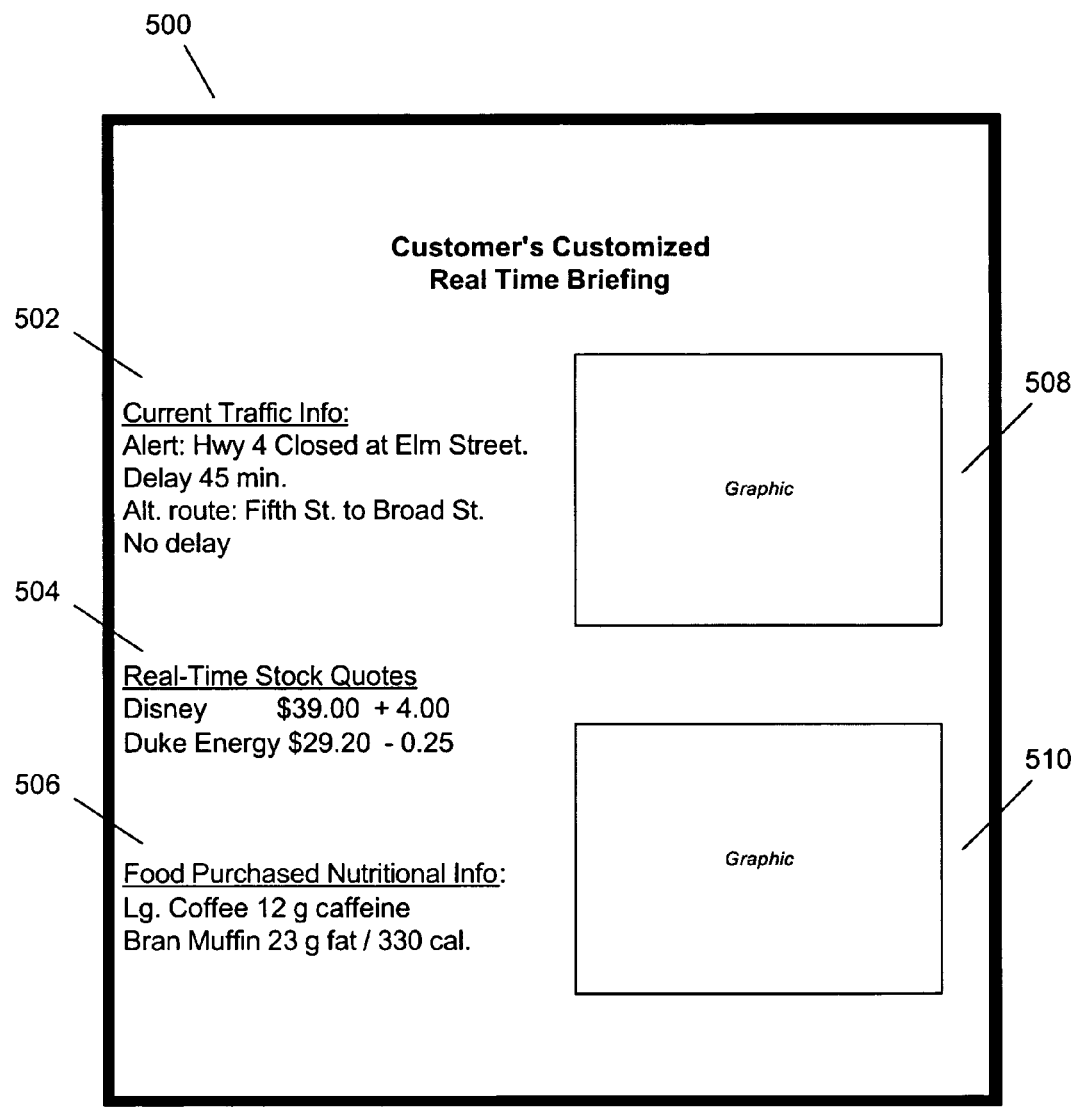
FIG. 5 illustrates an exemplary printed publication that may be delivered to a customer with the goods or services according to the present invention.

FIG. 5 illustrates in further detail an exemplary printed publication 500 that may be delivered to a customer with the goods/services, for example, a coffee and a muffin. The printed publication 500 includes current traffic information 502, real time stock quotes 504, nutritional information 506 pertaining to the food purchased in the transaction, and two separate graphics 508, 510.

In preferred features in accordance with the present invention, the graphics 508, 510 represent, for example, intra-day real time stock quotes for the selected stocks. Alternatively, or in addition thereto, graphics 508, 510 may be provided that represent advertisements for the provider or for a third party that is unrelated to the provider. In this latter context, the third party of the advertisement may pay the provider or pay the media profile manager for placement of the advertisement in the deliverable. Alternatively, the customer may identify an advertisement or, more likely, an entity that the customer desires to endorse, such as, for example, a professional or collegiate sports team or the customer's company.

Figure 6:
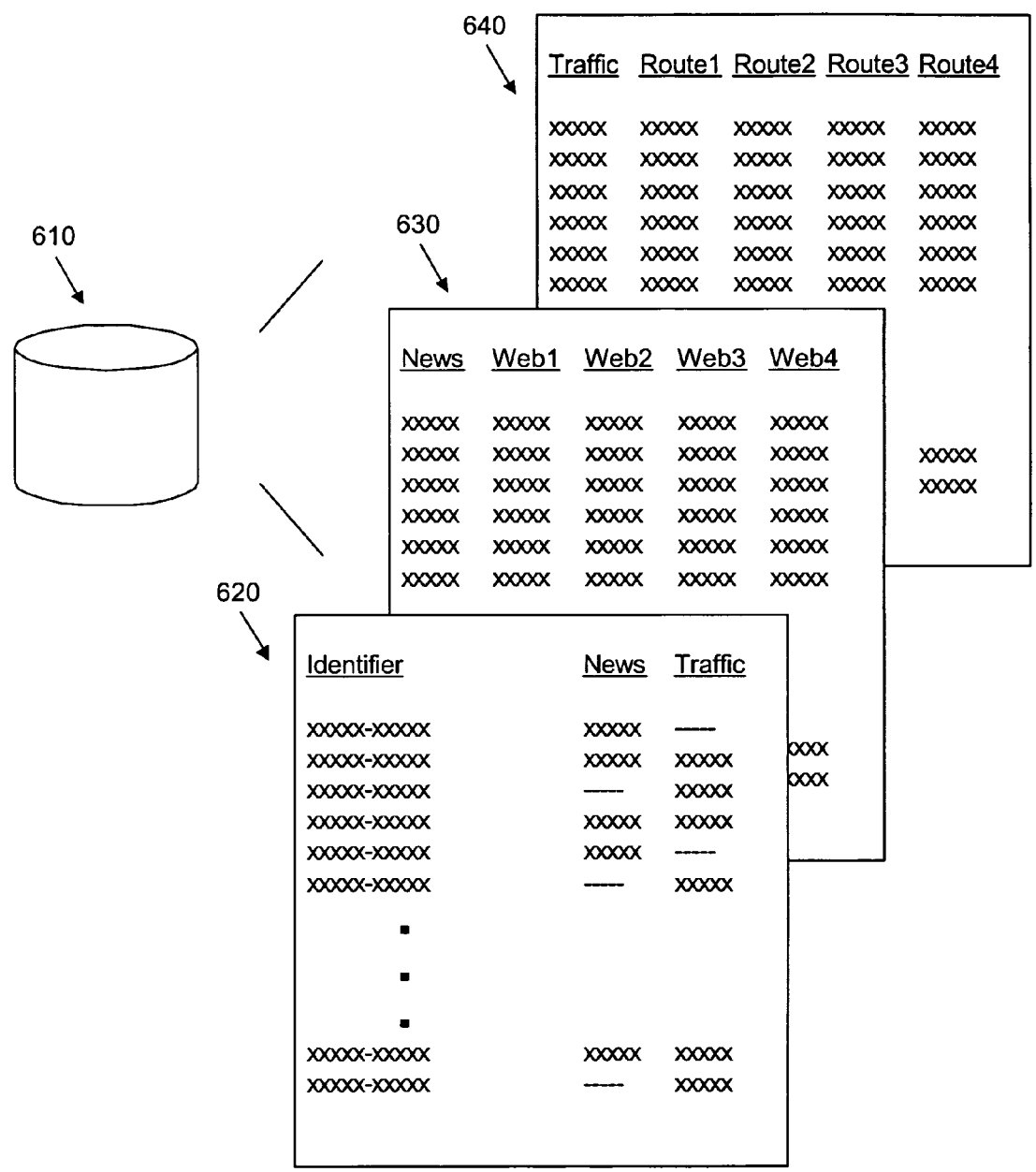
FIG. 6 illustrates an exemplary database structure for the media profile according to the present invention.

FIG. 6 illustrates an example of a database structure for the media profile database 610. In this example, a table 620 includes a list of identifiers. Each identifier in this example comprises a unique eight alphanumeric string "xxxx-xxxx"), and each identifier in this example uniquely corresponds to a customer. For each identifier, if the customer has selected news as a media content type, an index entry to a news table 630 is associated with that identifier of the customer. The index entry to the news table comprises a unique four digit alphanumeric string. If the customer has selected traffic information as a media content type, an index entry to a traffic information table 640 is associated with that identifier of the customer. The index entry to the traffic information table comprises a unique four digit alphanumeric string.

With reference to the news table 630, up to four websites, from which news items are acquired when generating a printed publication, are shown associated with each news table entry. Each news item represents a web clipping or story, and is selected by the customer when registering for the customized media distribution service. While use of four websites or news clippings is described herein, it should be understood that use of fewer or additional websites or clippings is contemplated by the present invention.

In similar manner, and with reference to the traffic information table 640, up to four routes that the customer might take, for which traffic information is acquired when generating a printed publication, are shown associated with each traffic information entry. While use of four routes is described herein, it should be understood that use of fewer or additional routes is contemplated by the present invention. Based on a particular route, current real time or near real time traffic information can be obtained regarding the particular route. If traffic information is selected as a media content type, the one or more routes are selected by the customer when registering for the customized media distribution service. The current real time or near real time traffic information for each route may be obtained from a third party source on the Internet that provides such a service.

Figure 7:
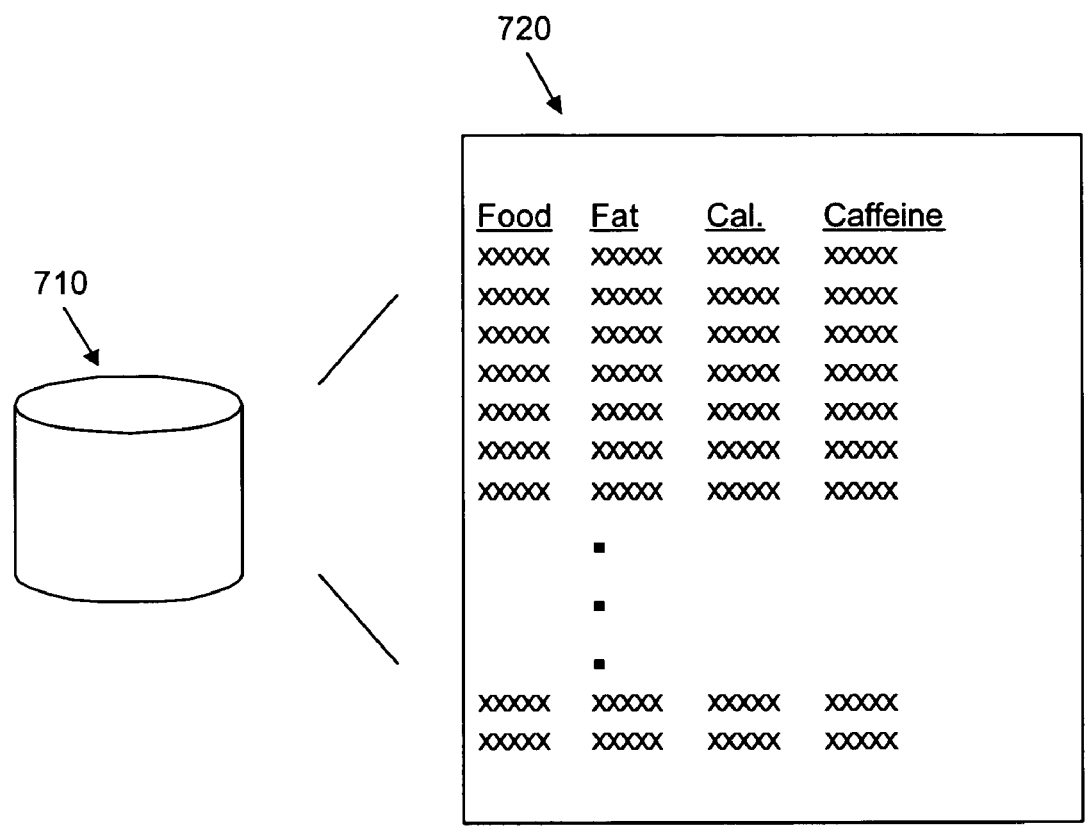
FIG. 7 illustrates an example of nutritional information that is maintained in a database according to the present invention.

FIG. 7 illustrates an example of nutritional information that is maintained in a database 710 in table 720. The database 710 may or may not be the same as database 610 and/or stored at the same location, and the nutritional information may or may not be stored in conjunction with the media profiles. However, if the customer pre-selected nutritional information as one of the media content types, the nutritional information pertaining to the food items purchased by the customer would be acquired from database 710. In this context, each food item that may be purchased by the customer preferably is associated with a nutritional information table index entry that comprises a unique four digit alphanumeric string. When the customer's order is entered into a terminal at the physical point of sale (PPOS) by the provider, the nutritional information table index entry is used to determine and acquire the nutritional information relevant to the food item purchased.

Figure 8:
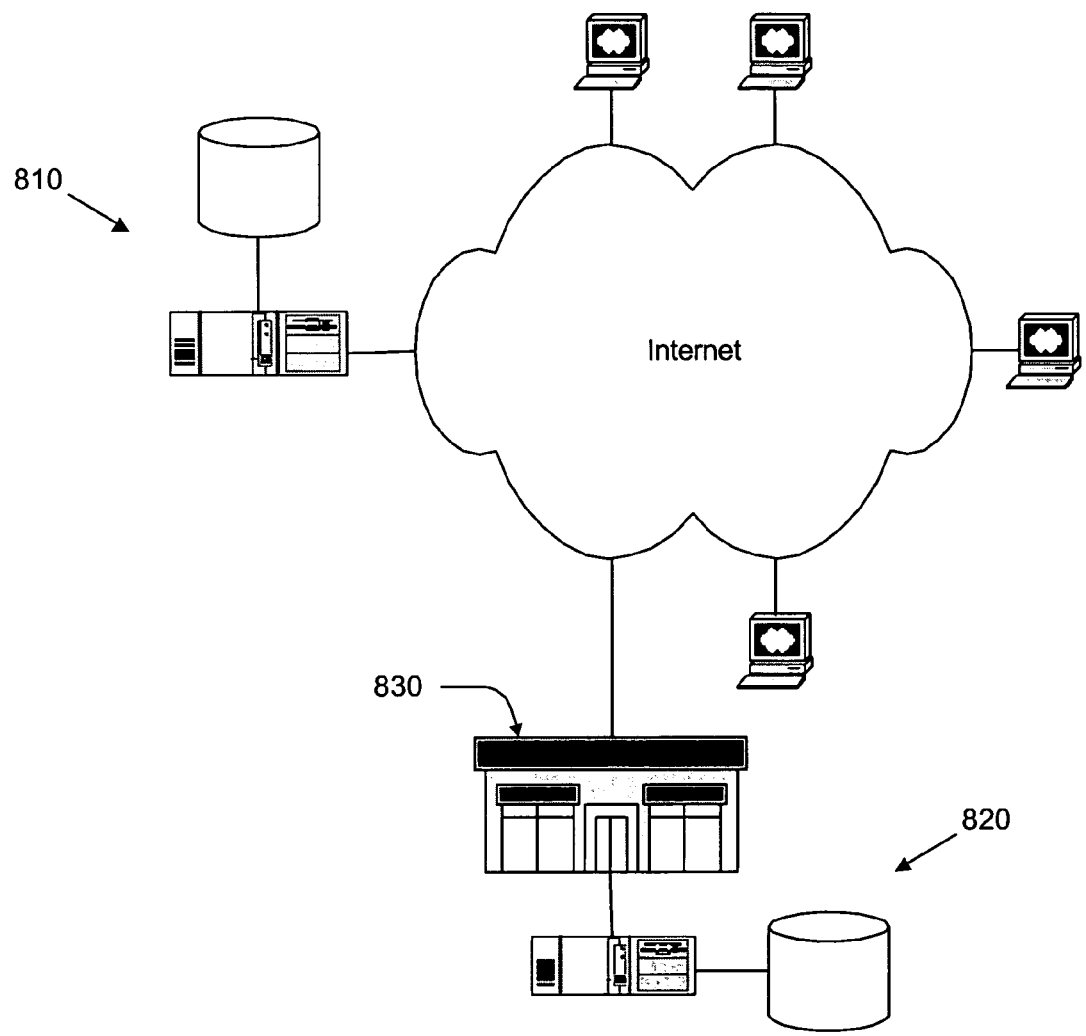
FIG. 8 illustrates an exemplary scenario in which the nutritional information is maintained in a database by the provider, but the media profiles are maintained elsewhere by a media profile manager.

An example of a scenario in which the nutritional information is maintained in a database by the provider, but the media profiles are maintained elsewhere by a media profile manager, is illustrated in FIG. 8. As shown therein, the database of media profiles is maintained in database 810 while the nutritional information is maintained in database 820 by the provider at the physical point of sale 830. Again, the database 810 is accessible by the customers and the provider via the Internet, for example.

Figure 9:
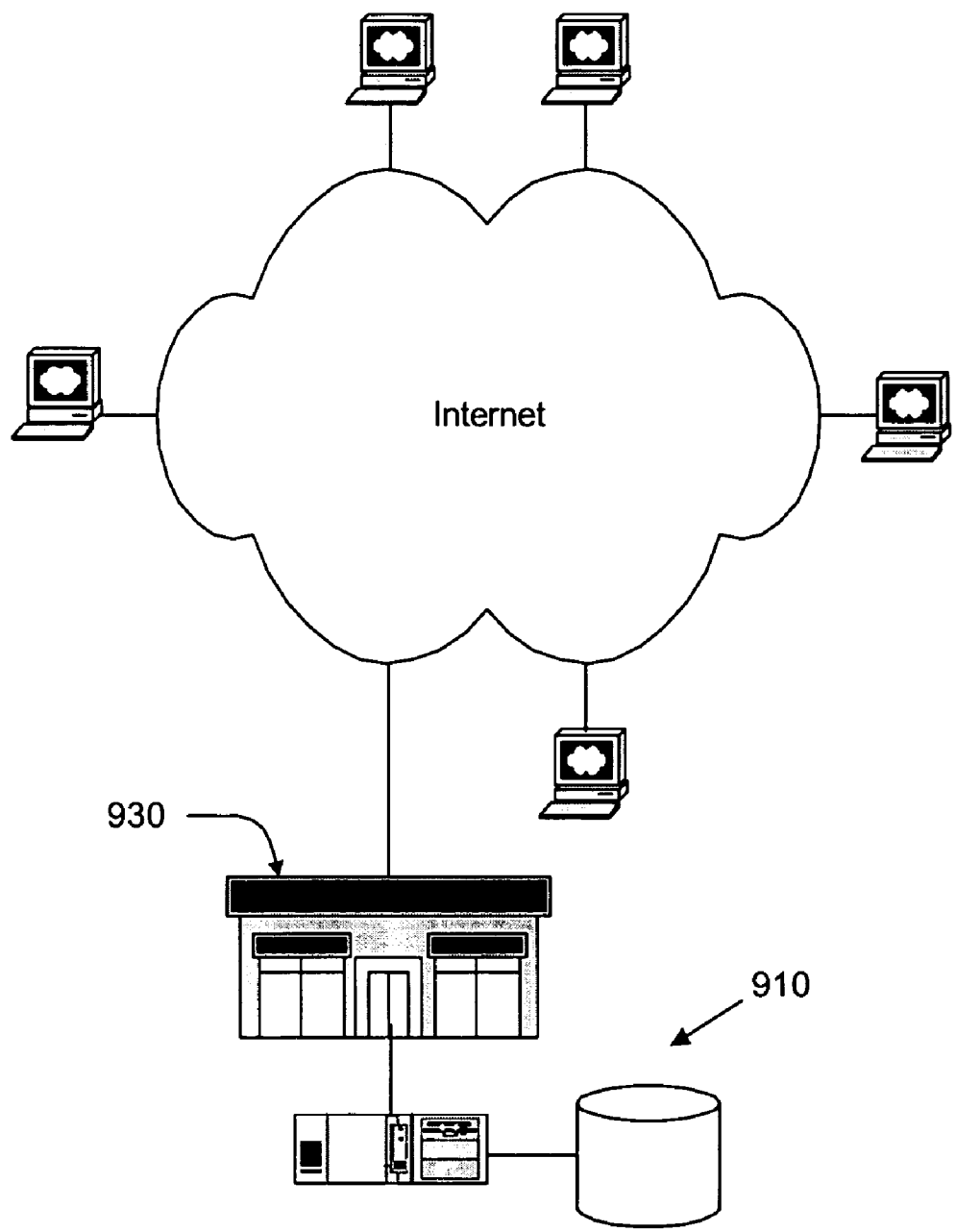
FIG. 9 illustrates an exemplary scenario in which a database maintained at the physical point of sale by the provider includes both the information necessary to maintain media profiles and other information.

An example of a scenario in which a database includes all the information necessary to maintain media profiles and other information, such as nutritional information, and is maintained at the PPOS by the provider is illustrated in FIG. 9. As shown therein, the database of media profiles and the nutritional information is maintained in database 910 by the provider at the physical point of sale 930. Again, the database 910 is accessible by the customers via the Internet, for example, for registering and/or updating the media profiles.

Figure 10:
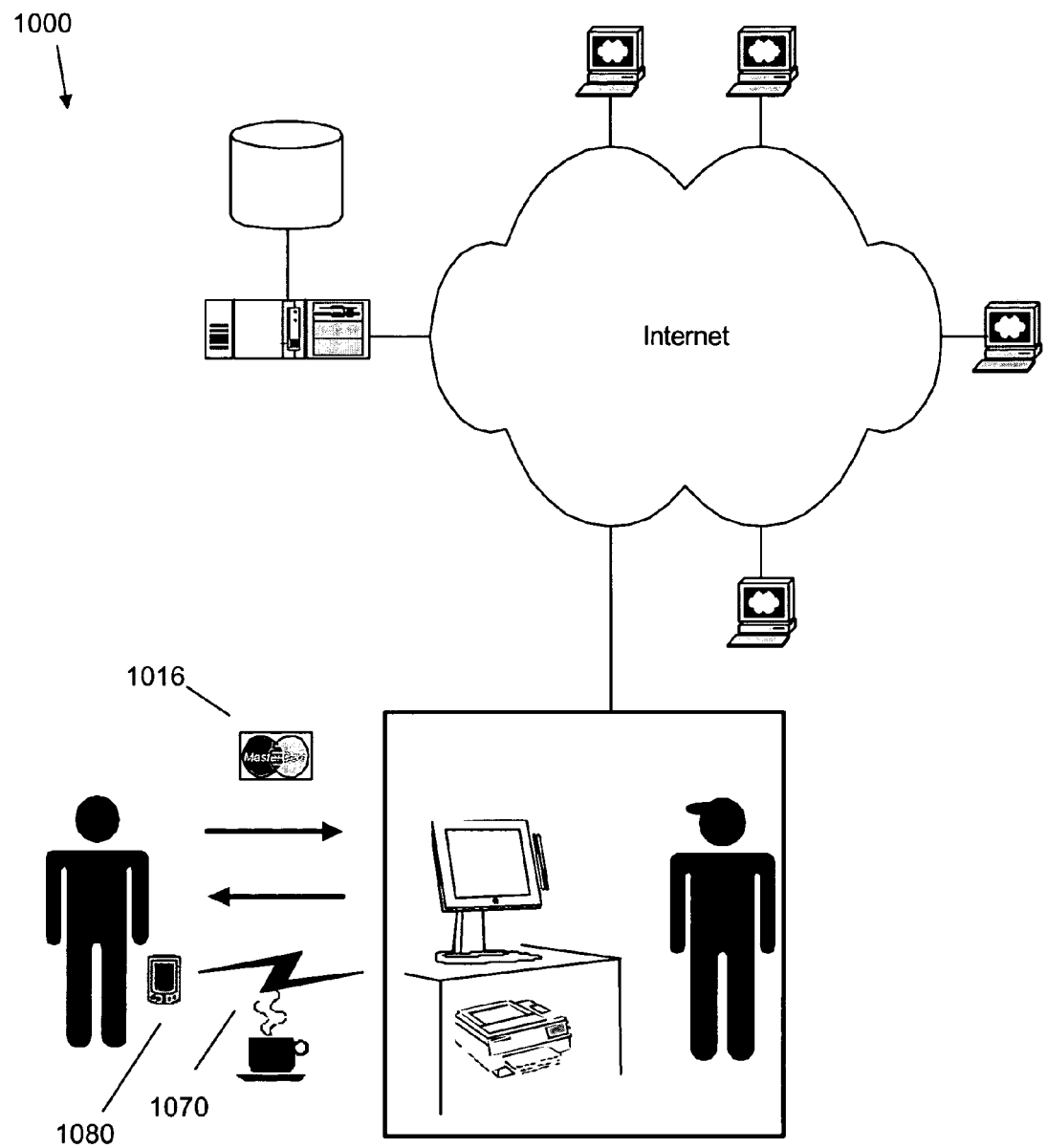
FIG. 10 illustrates an exemplary system for creating and maintaining media profiles for customers according to the present invention.

Another example of a system 1000 for creating and maintaining media profiles for customers similar to that of FIG. 4 is illustrated in FIG. 10. This system 1000 differs from that in FIG. 4 with respect to two features. First, the card 1016 is specifically illustrated as a credit card to emphasize this possibility according to various aspects of the present invention. Second, the deliverable does not include a printed publication as in the preferred embodiment of FIG. 4 but, instead, is an electronic communication 1070 to an electronic device 1080 of the customer of an item of a media content type selected beforehand by the customer.

In FIG. 10, the electronic device is shown, for example, a personal digital assistant (PDA), such as a Palm™ PDA, and the electronic communications may be by way of Wife, Bluetooth, infrared, or other conventional electronic communication means. In other alternatives, the electronic device includes, for example, a Windows-based PDA, laptop computer, a watch with built-in PDA capabilities, a personal communication device, a mobile phone, or a tablet PC. In any event, the electronic device is capable of receiving the electronic communication of the item of the media content type for review by the customer. Preferably, the electronic communication displays the item of the media content type for reading by the customer. The electronic communication originates from a transmitter (not shown) of the provider, such as, for example, a radio antenna, wireless network hub, infrared port, or the like.

Figure 11:
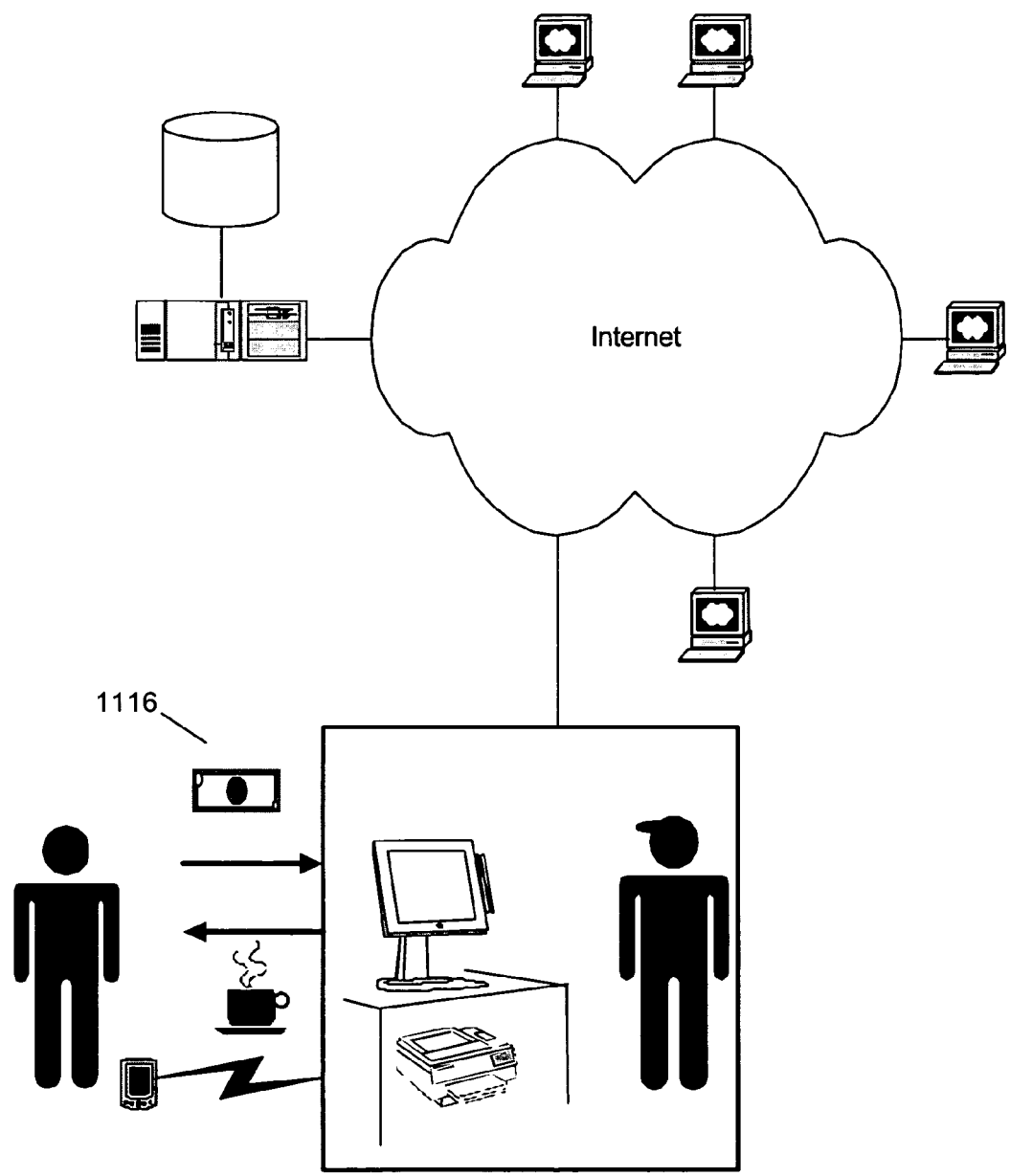
FIG. 11 illustrates an exemplary scenario in which cash is used for payment and the identifier of the customer is communicated by an electronic device that also electronically receives the deliverable.

According to various aspects of the present invention, an electronic device is used to effect payment in conducting the transaction in the context of electronic commerce. According to one variation, the same electronic device that is used to pay for the good/service also may receive an electronic communication of an item of a selected media content type and/or a printed publication of an item of a selected media content type may be directly provided to the customer by the provider. Of course, cash 1116 as shown in FIG. 11 may be used for payment, as is conventional, provided that the identifier of the media profile for the customer is communicated in some manner to the provider. In an example depicted in FIG. 11, cash 1116 is used for payment and the identifier of the media profile of the customer is communicated by the electronic device which also electronically receives the deliverable. In an alternative, for example, a card could be used with the cash to communicate the identifier to the provider.

Figure 12:
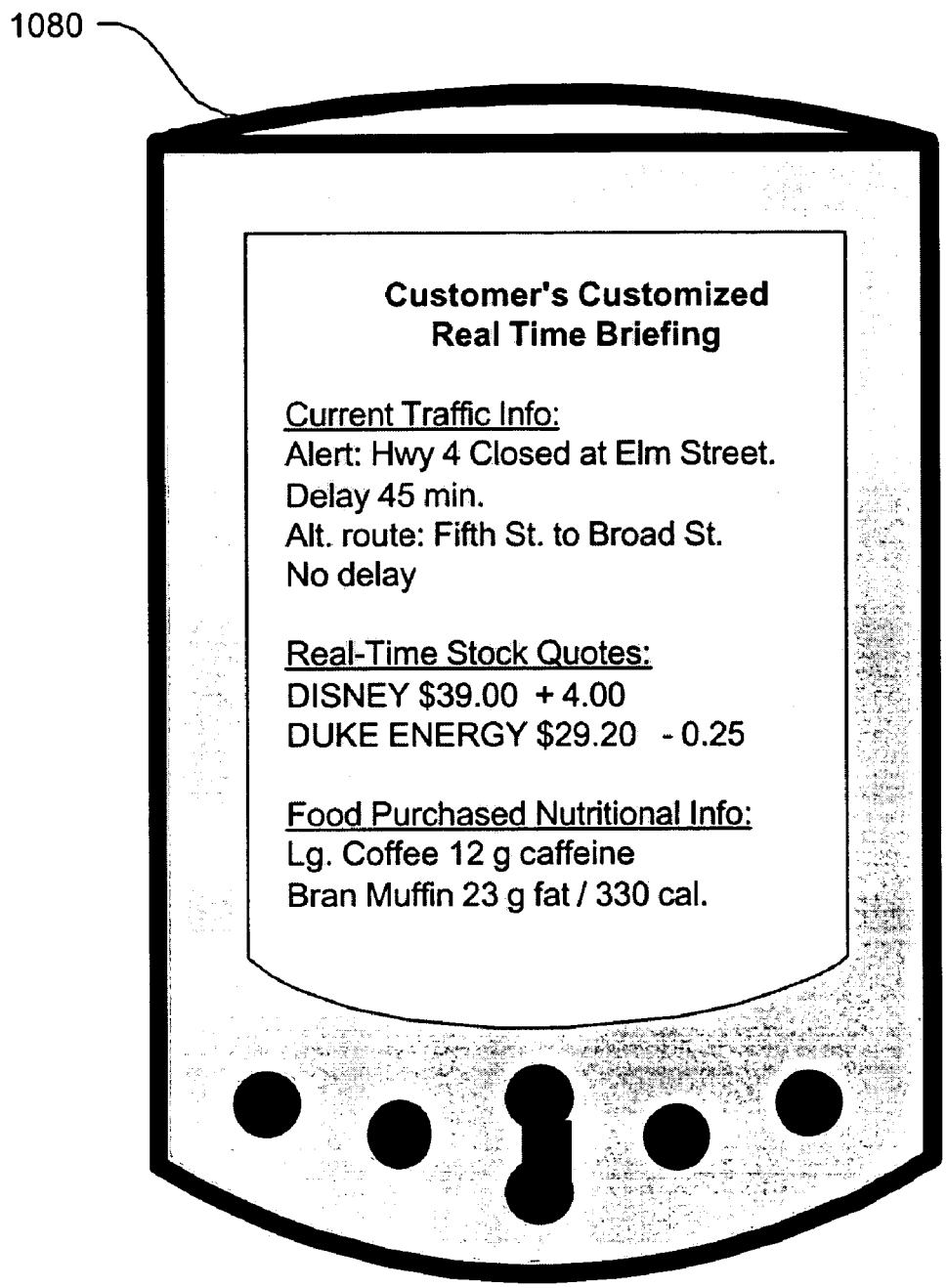
FIG. 12 illustrates an exemplary deliverable including an electronic communication that is received by an electronic device of a customer according to the present invention.

An example of a deliverable including an electronic communication that is received by an electronic device of a customer as shown, for example, in both FIGS. 10 and 11 is illustrated in FIG. 12, wherein the PDA is shown as displaying some of the same information as the printed publication 350 in FIG. 5. The graphics, while not shown in FIG. 12, optionally could also be included in the display in accordance with various aspects of the present invention.

In sum, the present invention is generally directed to a method of providing to a customer customized media at a physical point of sale (PPOS) of a good or service. The type of media provided to the customer is pre-selected by the customer. Thus, the customer is able to receive current information at the PPOS, such as news, stock quotes, traffic information, and so forth, thereby adding value to the customer's purchasing experience.

According to one aspect, the method includes receiving an identifier from the customer at the PPOS, retrieving a media profile that is maintained in a database in association with the identifier, the media profile identifying at least one media content type, generating a deliverable in accordance with the retrieved media profile by obtaining an item of the media content type identified in the retrieved media profile, and communicating the generated deliverable to the customer at the PPOS.

According to another aspect, the method of the present invention further includes receiving an identifier from the customer at the PPOS, determining a media content type that has been pre-selected by the customer, generating a deliverable by obtaining an item of the determined media content type, and communicating the generated deliverable to the customer at the PPOS.

According to still another aspect, the method includes maintaining in a computer database a plurality of media profiles for customers, each media profile including a unique identifier for each customer, each media profile identifying types of media content previously identified by each customer, receiving a unique identifier and retrieving the media profile for the unique identifier received, obtaining media content in accordance with the media profile, and communicating the media content to the particular customer in conjunction with a purchase by the customer at a physical point of sale of the purchase.

In view of the foregoing detailed description of, inter alia, preferred embodiments of the present invention, it readily will be understood by those persons skilled in the art that the present invention in all its aspects is susceptible of broad utility and application. While various embodiments of the present invention have been described herein in certain contexts, the embodiments may be useful in other contexts as well. Many embodiments and adaptations thereof other than those herein described, as well as many variations, modifications, and equivalent arrangements, will be apparent from or reasonably suggested by the present invention and the foregoing description thereof, without departing from the substance or scope of the present invention.

Furthermore, any sequence(s) and/or temporal order of steps of various processes described and claimed herein are those considered to be the best mode contemplated for one or more preferred embodiments of the present invention. It should also be understood that, although steps of various processes may be shown and described as being in a preferred sequence or temporal order, the steps of any such processes are not limited to being carried out in any particular sequence or order, absent a specific indication of such. In many cases, the steps of such processes may be able to be carried out in various different sequences and orders, while still falling within the scope of the present invention.

Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements thereof, the present invention being limited only by the claims appended hereto and the equivalents thereof.

What is claimed is:

1. A computer implemented method of providing to a customer customized media at a physical point of sale (PPOS) at a time of a sales transaction for a good/service, comprising the steps of:

storing a plurality of customer media profiles in a computer memory, each of the customer media profiles comprising a customer identifier and a media content type identifier associated with the customer identifier, the media content type identifier identifying a type of information, the type of information comprising information that is pre-selected by the customer prior to the time of the sales transaction for a good/service;

receiving a customer identifier from a customer at a point of sale computer located proximate to the PPOS, the point-of-sale computer being in electronic communication with the computer memory;

retrieving from the computer memory a media profile that is associated with the customer identifier received from the customer, by the point-of-sale computer;

generating via a computer processor an item of current time-sensitive information, the content of the generated item of current time-sensitive information being determined by the time of the sales transaction for the good/service and the type of information pre-selected by the customer and identified in the retrieved media profile; and communicating the generated item of current time-sensitive information, to the customer at the PPOS proximate to the time of the sales transaction.

2. The method of claim 1, wherein the step of communicating the generated item of current time-sensitive information comprises providing to the customer at the PPOS a printed publication including the generated item of current time-sensitive information.

3. The method of claim 1, wherein the step of communicating the generated item of current time-sensitive information comprises printing the item of current time-sensitive information.

4. The method of claim 1, wherein the step of communicating the generated item of current time-sensitive information comprises printing the item of current time-sensitive information on the group consisting of a tray mat, packaging, coffee cup, or bag, that is provided to the customer.

5. The method of claim 1, wherein the step of communicating the generated item of current time-sensitive information comprises wirelessly transmitting the item of current time-sensitive information to the customer.

6. The method of claim 1, wherein the step of communicating the generated item of current time-sensitive information comprises wirelessly transmitting the item of current time-sensitive information to a mobile computer device of the customer.

7. The method of claim 1, wherein the step of communicating the generated item of current time-sensitive information comprises wirelessly transmitting at the PPOS the item of current time-sensitive information to a personal digital assistant of the customer.

8. The method of claim 1, wherein the step of communicating the generated item of current time-sensitive information comprises wirelessly transmitting at the PPOS the item of current time-sensitive information to a personal communication device of the customer.

9. The method of claim 1, wherein the step of communicating the generated item of current time-sensitive information comprises wirelessly transmitting at the PPOS the item of current time-sensitive information to a web-enabled telephone of the customer.

10. The method of claim 1, wherein the media profile is unique to the customer.

11. The method of claim 1, further comprising receiving, via a communications network, a plurality of media profiles, wherein the customer selects the media content type when setting up or editing the media profile.

12. The method of claim 11, wherein the setting up or editing of the media profile by the customer is accomplished online via the Internet.

13. The method of claim 1, wherein the item of current time-sensitive information includes information obtained over a communications network at the time of the sales transaction of the good or service.

14. The method of claim 1, wherein the identifier comprises an account number of a loyalty program in which the customer is enrolled.

15. The method of claim 1, wherein the identifier comprises a public key of a public-private key pair of the customer.

16. The method of claim 1, wherein the step of receiving an identifier at the time of the sale of the good or service comprises reading the identifier from a magnetic stripe card of the customer at the PPOS.

17. A computer system for providing to a customer customized media at a physical point of sale (PPOS) at a time of a sales transaction for a good/service, comprising:
   a computer memory for
      storing a plurality of customer media profiles in a computer memory, each of the customer media profiles comprising a customer identifier and a media content type identifier associated with the customer identifier, the media content type identifier identifying a type of information, the type of information comprising information that is pre-selected by the customer prior to the time of the sales transaction for a good/service;
   a computer processor for
      receiving a customer identifier from a customer at a point of sale computer located proximate to the PPOS, the point-of-sale computer being in electronic communication with the computer memory;
      retrieving from the computer memory a media profile that is associated with the customer identifier received from the customer, by the point-of-sale computer;
      generating an item of current time-sensitive information, the content of the generated item of current time-sensitive information being determined by the time of the sales transaction for the good/service and the type of information pre-selected by the customer and identified in the retrieved media profile; and
      communicating the generated item of current time-sensitive information to the customer at the PPOS proximate to the time of the sales transaction.

18. A computer program product comprising software for providing to a customer customized media at a physical point of sale (PPOS) at a time of a sales transaction for a good/service, the computer program product being comprised of a computer readable medium having stored thereon instructions, which when executed by a processor, cause the processor to:
   store a plurality of customer media profiles in a computer memory, each of the customer media profiles comprising a customer identifier and a media content type identifier associated with the customer identifier, the media content type identifier identifying a type of information, the type of information comprising information that is pre-selected by the customer prior to the time of the sales transaction for a good/service;
   receive a customer identifier from a customer at a point of sale computer located proximate to the PPOS, the point-of-sale computer being in electronic communication with the computer memory;
   retrieve from the computer memory a media profile that is associated with the customer identifier received from the customer, by the point-of-sale computer;
   generate via a computer processor an item of current time-sensitive information, the content of the generated item of current time-sensitive information being determined by the time of the sales transaction for the good/service and the type of information pre-selected by the customer and identified in the retrieved media profile; and
   communicate the generated item of current time-sensitive information to the customer at the PPOS proximate to the time of the sales transaction.

19. The computer system of claim 17, wherein the step of communicating the generated item of current time-sensitive information comprises providing to the customer at the PPOS a printed publication including the generated item of current time-sensitive information.

20. The computer system of claim 17, wherein the step of communicating the generated item of current time-sensitive information comprises printing the item of current time-sensitive information.

21. The computer system of claim 17, wherein the step of communicating the generated item of current time-sensitive information comprises printing the item of current time-sensitive information on the group consisting of a tray mat, packaging, coffee cup, or bag, that is provided to the customer.

22. The computer system of claim 17, wherein the step of communicating the generated item of current time-sensitive information comprises wirelessly transmitting the item of current time-sensitive information to the customer.

23. The computer system of claim 17, wherein the step of communicating the generated item of current time-sensitive information comprises wirelessly transmitting the item of current time-sensitive information to a mobile computer device of the customer.

24. The computer system of claim 17, wherein the media profile is unique to the customer.

25. The computer system of claim 17, wherein the identifier uniquely identifies a class of customers from a plurality of classes of customers.

26. The computer system of claim 17, wherein the classes of customers are mutually exclusive.

27. The computer system of claim 17, wherein the identifier uniquely identifies a subset of classes of customers from a set of a plurality of classes of customers.

28. The computer system of claim 17, further comprising receiving, via a communications network, a plurality of media profiles, wherein the customer selects the media content type when setting up or editing the media profile.

29. The computer system of claim 17, wherein the setting up or editing of the media profile by the customer is accomplished online via the Internet.

30. The computer system of claim 17, wherein the item of current time-sensitive information includes information obtained via a communications network at the time of the sales transaction of the good or service.

31. The computer program product of claim 18, wherein the step of communicating the generated item of current time-sensitive information comprises providing to the customer at the PPOS a printed publication including the generated item of current time-sensitive information.

32. The computer program product of claim 18, wherein the step of communicating the generated item of current time-sensitive information comprises printing the item of current time-sensitive information.

33. The computer program product of claim 18, wherein the step of communicating the generated item of current time-sensitive information comprises printing the item of time-sensitive information on the group consisting of a tray mat, packaging, coffee cup, or bag, that is provided to the customer.

34. The computer program product of claim 18, wherein the step of communicating the generated item of current time-sensitive information comprises wirelessly transmitting the item of current time-sensitive information to the customer.

35. The computer program product of claim 18, wherein the step of communicating the generated item of current time-sensitive information comprises wirelessly transmitting the item of current time-sensitive information to a mobile computer device of the customer.

36. The computer program product of claim 18, wherein the media profile is unique to the customer.

37. The computer program product of claim 18, wherein the identifier uniquely identifies a class of customers from a plurality of classes of customers.

38. The computer program product of claim 18, wherein the classes of customers are mutually exclusive.

39. The computer program product of claim 18, wherein the identifier uniquely identifies a subset of classes of customers from a set of a plurality of classes of customers.

40. The computer program product of claim 18, further comprising receiving, via a communications network, a plurality of media profiles, wherein the customer selects the media content type when setting up or editing the media profile.

41. The computer program product of claim 18, wherein the setting up or editing of the media profile by the customer is accomplished online via the Internet.

42. The computer program product of claim 18, wherein the item of current time-sensitive information includes information obtained over a communications network at the time of the sales transaction of the good or service.

* * * * *